(12) United States Patent
Deschenes et al.

(10) Patent No.: US 12,461,584 B2
(45) Date of Patent: Nov. 4, 2025

(54) OPTIMAL RAM LAYOUT FOR POWER CONSUMPTION

(71) Applicant: Silicon Laboratories Inc., Austin, TX (US)

(72) Inventors: Jean Francois Deschenes, Ste-Marthe-sur-le-lac (CA); Cedric Migliorini, Roxboro (CA)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 18/615,510

(22) Filed: Mar. 25, 2024

(65) Prior Publication Data
US 2025/0298459 A1 Sep. 25, 2025

(51) Int. Cl.
*G06F 1/32* (2019.01)
*G06F 1/3234* (2019.01)
*G06F 1/3296* (2019.01)

(52) U.S. Cl.
CPC .......... *G06F 1/3275* (2013.01); *G06F 1/3296* (2013.01)

(58) Field of Classification Search
CPC .................................................. G06F 1/3275
See application file for complete search history.

(56) References Cited

U.S. PATENT DOCUMENTS

| | | | |
|---|---|---|---|
| 2008/0005516 A1* | 1/2008 | Meinschein | G06F 1/3275 711/E12.006 |
| 2021/0064113 A1* | 3/2021 | Laurent | G11C 11/2293 |
| 2021/0318965 A1* | 10/2021 | Kumar | G06F 1/3225 |
| 2024/0111437 A1 | 4/2024 | Knaappila et al. | |

OTHER PUBLICATIONS

Notice of Allowance mailed Sep. 2, 2025 in co-pending U.S. Appl. No. 18/612,318.

* cited by examiner

*Primary Examiner* — Stefan Stoynov
(74) *Attorney, Agent, or Firm* — Nields, Lemack & Frame, LLC

(57) ABSTRACT

An improved layout for volatile memory is disclosed. The volatile memory comprises a plurality of banks that may be independently powered during deep sleep mode. The memory layout attempts to locate all items and data that are retained near one end of the volatile memory, such as near the starting address of the volatile memory. These items include secure RAM, instructions that have been copied from a nonvolatile memory, and metadata associated with memory reservations. Additionally, buffers that do not need to be retained during deep sleep mode are disposed on the opposite end of the volatile memory, such as near the ending address. Memory that is allocated for the user level software is categorized as "long-term" and "short-term". Allocations of "long-term" blocks are located near the metadata for the memory reservations, while allocations of "short-term" blocks are located near the opposite end of the memory.

18 Claims, 6 Drawing Sheets

OPTIMAL RAM LAYOUT FOR POWER CONSUMPTION

FIELD

This disclosure describes systems and methods for the allocation of memory within a volatile memory device that achieves reduced power consumption.

BACKGROUND

Many wireless protocols, such as Bluetooth Low Energy (BLE) and others, are enabling the Internet of Things (IOTs). One aspect of these IOT devices is their low power consumption, often allowing them to operate for extended periods of time using a battery. This is often accomplished by placing the device into a low power sleep mode. In this deep sleep mode, many components may be powered down, such as the network interface, the processing unit and others. Therefore, in deep sleep mode, one of the largest consumers of power is the volatile memory device.

To combat this issue, the volatile memory in these devices may be divided into banks, where each bank may be powered on or powered off independently. Thus, if a bank is unused, or only contains data that is disposable, this bank may be powered off during the deep sleep mode. On the other hand, if a bank contains instructions, a network stack, or other important information, it may remain powered during the deep sleep mode so that the information is retained.

These banks are typically relatively large, such as 16 Kbytes or larger. Thus, the allocation of information into the volatile memory is key to determining how many of the memory banks may be powered off during deep sleep mode.

Thus, an improved method and system for allocating blocks of memory so as to minimize the number of banks that must remain powered during deep sleep mode would be beneficial.

SUMMARY

An improved layout for volatile memory is disclosed. The volatile memory comprises a plurality of banks that may be independently powered during deep sleep mode. The memory layout attempts to locate all items and data that are retained near one end of the volatile memory, such as near the starting address of the volatile memory. These items include secure RAM, instructions that have been copied from a nonvolatile memory, and metadata associated with memory reservations. Additionally, buffers that do not need to be retained during deep sleep mode are disposed on the opposite end of the volatile memory, such as near the ending address. Memory that is allocated for the user level software is categorized as "long-term" and "short-term". Allocations of "long-term" blocks are located near the metadata for the memory reservations, while allocations of "short-term" blocks are located near the opposite end of the memory.

According to one embodiment, a method of allocating memory within a memory device is disclosed, wherein the memory device is implemented using a plurality of banks, wherein power to each bank is independently controlled. The method comprises performing a link time phase, wherein certain portions of the memory device are designated by a linker; and performing a run time phase, which comprises: copying instructions from a nonvolatile memory to a first portion of the memory device previously designated by the linker; receiving memory requirements from user level software and based on those memory requirements, performing an initialization process, wherein the initialization process comprises: allocating memory for data buffers which do not need to be retained during deep sleep mode in a second portion of the memory device; and servicing memory reservations from user level software after the copying and allocating are completed; wherein memory that is reserved is disposed in a third portion located between the first portion and the second portion. In some embodiments, servicing memory reservations comprises: reserving a block of memory, having a size requested by the user level software in a respective memory reservation; and storing metadata associated with a corresponding reserved block; wherein the reserved block and the metadata are not located adjacent to one another. In certain embodiments, the run time phase further comprises: allocating memory for user level software in the memory device, after the memory reservations have been serviced. In certain embodiments, the memory that is allocated for the user level software is disposed in a fourth portion between the metadata for the reserved blocks and the reserved blocks. In certain embodiments, allocating memory comprises: allocating memory based on a lifespan, as indicated by the user level software, such that blocks associated with long term allocations are disposed near a first end of the fourth portion and blocks associated with short term allocations are disposed near an opposite second end of the fourth portion. In some embodiments, the first end is adjacent to the metadata for the reserved blocks. In some embodiments, the opposite second end is adjacent to the reserved blocks. In some embodiments, the metadata for the reserved blocks is disposed adjacent to the first portion; and the reserved blocks are disposed adjacent to the second portion.

According to another embodiment, a device is disclosed. The device comprises a processing unit; a nonvolatile memory; a data memory device, comprising a plurality of banks wherein power to each bank is independently controlled; and a memory manager, wherein the memory manager is configured to: copy instructions from the nonvolatile memory to a first portion of the memory device previously designated by a linker; receive memory requirements from user level software and based on those memory requirements, perform an initialization process, wherein the initialization process comprises: allocating memory for data buffers which do not need to be retained during deep sleep mode in a second portion of the memory device; and servicing memory reservations from user level software after the copying and allocating are completed; wherein memory that is reserved is disposed in a third portion located between the first portion and the second portion. In some embodiments, to service a memory reservation, the memory manager reserves a block of memory, having a size requested by the user level software in a respective memory reservation; and stores metadata associated with a corresponding reserved block; wherein the reserved block and the metadata are not located adjacent to one another. In some embodiments, the memory manager allocates memory for the user level software after the memory reservations have been serviced. In some embodiments, the memory manager allocates the memory for the user level software in a fourth portion between the metadata for the reserved blocks and the reserved blocks. In certain embodiments, the memory manager allocates memory based on a lifespan, as indicated by the user level software, such that blocks associated with long term allocations are disposed near a first end of the fourth portion and blocks associated with short term allocations are disposed near an opposite second end of the fourth portion.

In some embodiments, the first end is adjacent to the metadata for the reserved blocks. In certain embodiments, the opposite second end is adjacent to the reserved blocks. In certain embodiments, the memory manager disposes the metadata for the reserved blocks adjacent to the first portion; and disposes the reserved blocks adjacent to the second portion.

According to another embodiment, a device is disclosed. The device comprises a processing unit; a nonvolatile memory; and a data memory device, comprising a plurality of banks wherein power to each bank is independently controlled; wherein the data memory device is organized to contain, in sequence, copied instructions, metadata for memory reservations, memory allocations, reserved blocks associated with the memory reservations, and data buffers. In certain embodiments, the data memory device is organized such that data that needs to be retained during deep sleep mode is located at the beginning of the data memory device.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
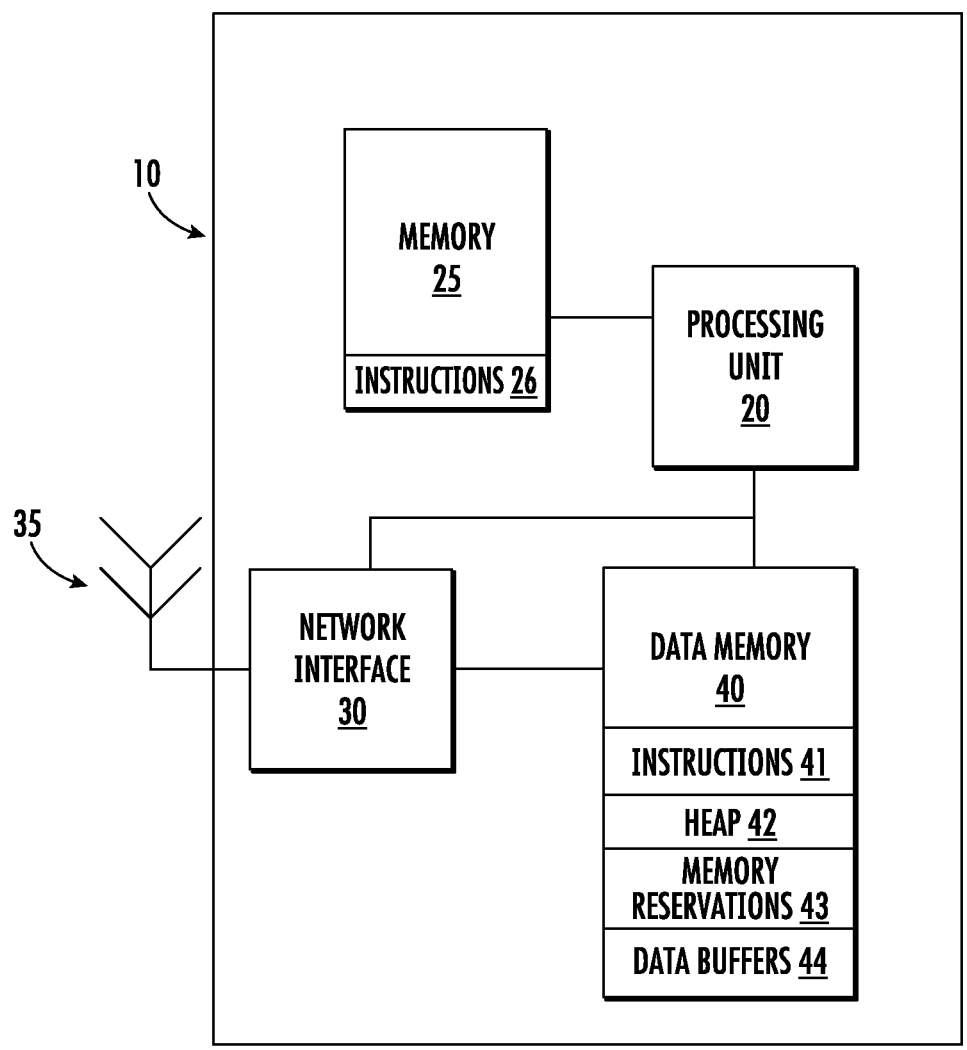
FIG. 1 shows a block diagram of a wireless network device that may utilize the memory allocation scheme described herein.

FIG. 1 shows a block diagram of a representative network device 10 that is able to minimize the number of memory banks that must remain powered during deep sleep mode according to one embodiment.

The network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 also includes a network interface 30, which may be a wireless interface that connects with an antenna 35. The network interface 30 may support any wireless network, such as Bluetooth, Wi-Fi, networks utilizing the IEEE 802.15.4 specification, such as Zigbee and Wi-SUN, networks utilizing the IEEE 802.15.6 specification, and wireless smart home protocols, such as Z-Wave. Further, the network interface 30 may also support a proprietary or custom wireless network. The network interface 30 includes a transmit circuit which is used to transmit data from this network device 10 using the antenna 35. The network interface 30 also includes a receive circuit which is used to receive packets.

The network device 10 may include a data memory device 40 in which data that is received and transmitted by the network interface 30 is stored. This data memory device 40 is traditionally a volatile memory. The processing unit 20 has the ability to read and write the data memory device 40 so as to communicate with the other nodes in the wireless network. Although not shown, the network device 10 also has a power supply, which may be a battery or a connection to a permanent power source, such as a wall outlet.

While the processing unit 20, the memory device 25, the network interface 30, and the data memory device 40 are shown in FIG. 1 as separate components, it is understood that some or all of these components may be integrated into a single electronic component. Rather, FIG. 1 is used to illustrate the functionality of the network device 10, not its physical configuration. Further, while the above describes a network device, it is understood that this technique is applicable to any device that seeks to limit power consumption while in deep sleep mode.

Further, the data memory device 40 may be segmented into a plurality of banks, wherein each bank may be independently powered. In this way, any or all of the banks may be powered on or off during deep sleep mode.

Additionally, as shown in FIG. 1, the data memory device 40 may be used to retain many types of information. For example, for speed of execution, some or all of the instructions 26 in the memory device 25 may be copied to the data memory device 40 and saved as instructions 41. Ideally, these instructions 41 are located in one or more banks that remain powered during deep sleep mode.

Additionally, the data memory device 40 is also used to hold data buffers 44. These data buffers 44 may represent data that has been received from the network interface 30 or will be transmitted using the network interface 30. Typically, the network device 10 does not enter deep sleep mode if there are any data buffers that have not been processed. Thus, the data buffers 44 may be located in one or more banks that are powered off during deep sleep mode.

Additionally, there is another section of the data memory device 40 that may be referred to as the heap 42. The heap 42 includes variables or areas that are utilized by the various software applications and modules that are executed by the processing unit 20. Consequently, it may be difficult to determine whether the banks that are used for the heap 42 should remain powered during deep sleep mode. As will be described in more detail below, located within the heap 42 are regions that are referred to as memory reservations 43.

Figure 2:
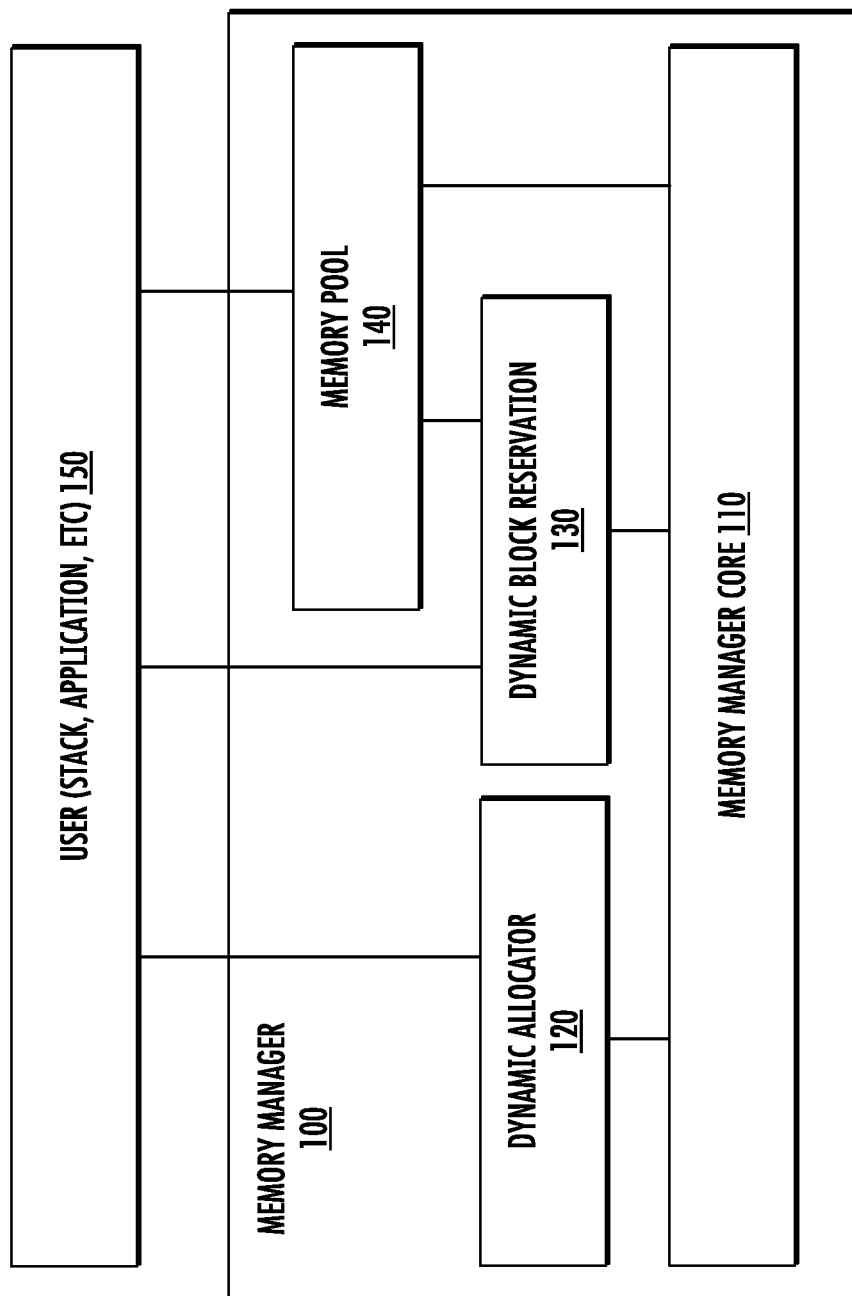
FIG. 2 shows a block diagram of the memory manager according to one embodiment.

To coordinate the allocation of memory, a software module, referred to as the memory manager 100 is included, as shown in FIG. 2. A software module represents a set of instructions that, when executed by the processing unit 20, perform the functions described for that module.

The memory manager 100 may include a memory manager core 110, a dynamic allocator 120, a dynamic block reservation module 130, and optionally a memory pool module 140. The memory manager 100 communicates with higher level applications, such as network stacks, applications and other features, which may be defined as the user level software 150. The user level software 150 requests different operations from the memory manager 100. These operations include allocation of memory and release of previously allocated memory, among others.

Each component of the memory manager 100 is now described in more detail. The memory manager core 110 handles the high level partitioning of the data memory device 40. For example, it reserves the regions of the memory that are used for the instructions 41. The memory manager core 110 may also reserve the blocks that never need to remain powered during deep sleep mode. These blocks may be assigned to data buffers 44, for example. The remaining memory may be configured as the heap 42. The heap 42 may span a plurality of banks of RAM, each of which may be powered on or off during deep sleep mode.

Thus, the memory manager core 110 also manages the various banks and their retention configurations. In this disclosure, the term "retention" is used to denote that the bank that contains a particular block must remained powered during deep sleep mode. The memory manager core 110 may utilize a plurality of counters, each associated with a respective bank. For example, at initialization, the counters associated with each bank that holds the heap 42 may be set to "0", which means that these banks may be powered off during deep sleep mode.

Whenever a block is allocated in one of these banks, the counter corresponding to that bank is incremented. Each time a block in that bank is released, the counter is decremented. The memory manager core 110 then updates the retention flag, which denotes that any non-zero value indicates that the bank must remain powered on during deep sleep mode.

The dynamic allocator 120 is used to dynamically allocate and free memory blocks of various sizes. In certain embodiments, the dynamic allocator 120 receives a request from the user level software 150. That request includes the size of the block being requested, along with its expected lifespan. For example, the user level software 150 may categorize a block as "long-term" or "short-term". "Short-term" is meant to denote that it is expected that the block will be released before the next time that the network device 10 enters deep sleep mode. For example, a message in the internal message queue may be expected to be "short-term" data. Generic data buffers are usually short-lived, given that if there is data in the buffers, it is expected to be processed before entering a sleep state. However, an application could still categorize certain buffers to be long-lived, as an example, advertisement data associated with Bluetooth may be categorized as "long-term" data. Thus, the terms "short-term" and "long-term" refer to the expected lifespan of the block being requested. A useful criteria for determining which category a particular request should use is whether the data stored in the memory allocated to the request is expected to be needed after the next sleep state. If not, the memory request may be categorized as "short-term" and if the data is needed after the sleep state, the request may be categorized as "long-term". The particular user level software 150 may have different or additional criteria for determining categorizations.

Thus, the interface between the user level software 150 and the dynamic allocator 120 allows the user level software 150 to:

Request the allocation of a block of memory of a requested size; and

Release that allocated block of memory.

Thus, this interface is similar to the malloc( )/free( ) functions used by the C language.

Further, as noted above, the requests also include a flag indicating whether the block of memory is categorized as "short-term" or "long-term".

The dynamic allocator 120 uses this categorization to determine where in memory the block should be allocated from. For example, the heap 42 is a large block having a starting address, also referred to as the beginning of the heap 42, and an ending address, referred to as the end of the heap 42. Allocations that are categorized as "long-term" may be made starting near the beginning of the heap, while blocks categorized as "short-term" may be made from near the end of the heap 42. The dynamic allocator 120 may utilize any allocation method, such as the first-fit method. The first-fit method has the advantage that it can be used to search from both ends of a double-linked list. In this disclosure, the term "near the beginning of the heap" denotes that the block may be allocated by traversing the double-linked list starting at the beginning of the list until a free block is located. Further, the term "near the end of the heap" denotes that the block may be allocated by traversing the double-linked list starting at the end of the list until a free block is located.

Having the allocation of the memory begin from both ends of the heap 42 has several advantages. First, by working from opposite ends of the heap 42, the amount of memory designated for "short-term" and "long-term" allocations is not fixed. Second, by placing the "short-term" allocations near the end of the heap 42, this maximizes the possibility of more banks being powered off during deep sleep mode.

Figure 3:
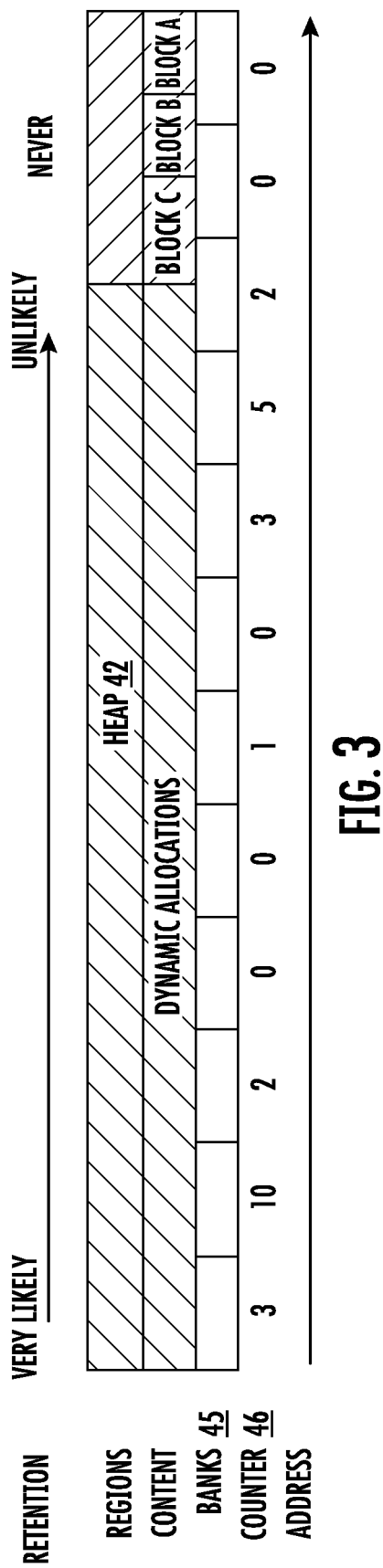
FIG. 3 shows the allocation of memory blocks according to one embodiment.

As noted above, the memory manager core 110 maintains counters of each bank. An example of this is shown in FIG. 3. As explained above, the memory manager core 110 first allocates the blocks that are never to be retained. These may be located at the end of the physical memory, and are labeled Block A, Block B and Block C in this figure. These may occupy one or more banks 45. A large region of the memory is identified as the heap 42. As shown by the arrows, the long-term allocations are made starting near the beginning of the heap 42, while short-term allocations are made starting near the end of the heap 42. The heap 42 spans a plurality of banks 45. Further, the counter 46 associated with each bank 45 is also shown. Note that, when the network device 10 is ready to enter deep sleep mode, the device checks the value of each counter 46. Any bank 45 with a non-zero count remains powered during the deep sleep mode, while all banks 45 with a zero value of the counter 46 are powered off.

The dynamic allocator 120 also creates the metadata that is appended to each block that is allocated. The metadata includes information such as:

whether the block is currently allocated;
the length of the block;
pointer to the metadata for the next block; and
pointer to the metadata for the previous block.

Note that the pointers may be expressed as absolute addresses or as relative offsets from the current pointer. Further, the use of both pointers to the next block and the previous block allows formation of a double-linked list.

Figure 4:
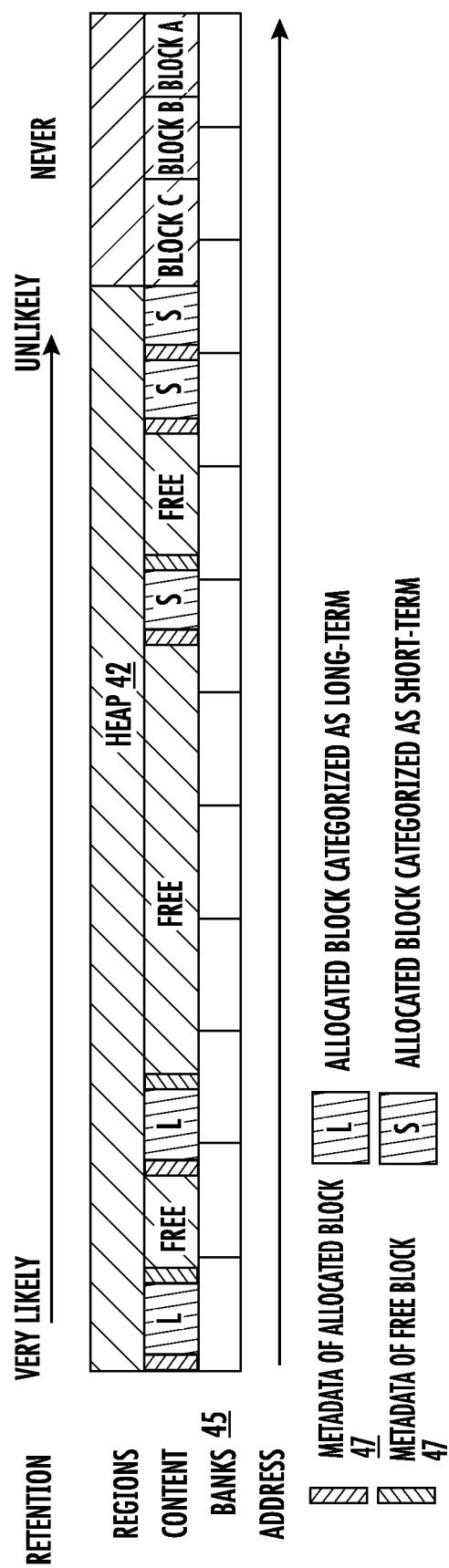
FIG. 4 shows the location of metadata associated with allocated and free memory blocks.

Further, the metadata immediately precedes the block, as shown in FIG. 4. In this figure, there are 8 sets of metadata 47 shown. As explained above, the "long-term" blocks start near the beginning of the heap 42. In this case, two blocks of "long-term" data have been allocated. An unused block exists between these two blocks. For example, that block may have been allocated prior to the second allocated "long-term" block, but has since been released. In this case, the metadata 47 indicates the length of the block, the pointers to the previous and next metadata and also indicates that the block is free. Additionally, there are three blocks of "short-term" data that have been allocated. Again, an unused block exists between these blocks. Further, there is also a large block of unused data between the "long-term" blocks and the "short-term" blocks. This may represent memory space that has yet to be allocated.

In some embodiments, the metadata associated with unallocated or released blocks may be retained to ensure coherence of the double-linked lists. Thus, in certain embodiments, the counter 46 associated with a bank 45 is incremented if a block is allocated in that bank. Further, the counter 46 is incremented again if the metadata for that allocated block is also located in this bank. When the block is later released, the counter is decremented by one since the block is no longer allocated. However, the counter 46 may still be non-zero due to the presence of the metadata associated with the freed block.

In some embodiments, after the block is unallocated, the memory manager core 110 or the dynamic allocator 120 checks if the block immediately following this newly released block is also free. If it is, the metadata for this newly released block is modified to include the size of the next block (which is also free) and is also updated to point to the metadata of the block after the next block. In this way, the metadata of the block that immediately follows the newly released block is unnecessary and may be released. The counter 46 associated with the bank 45 that contained that metadata is decremented. Further, the memory manager core 110 or the dynamic allocator 120 also checks if the block immediately preceding this newly released block is free. If so, the metadata of the previous block is modified to include the size of the newly released block and is also updated to point to the metadata of the block immediately following the newly released block. In this way, the metadata of the newly released block is unnecessary and may be released. Again, the counter 46 associated with the bank 45 that contained that metadata may be decremented. Thus, when a block is released, it may be merged with 0, 1 or 2 blocks to form a larger unallocated block.

Of course, other techniques may be used to merge unallocated blocks together to form larger blocks, which reduces the amount of metadata that must be retained during deep sleep mode.

Note that the dynamic allocator 120 and the memory manager core 110 treat any allocated blocks as blocks that must be retained during deep sleep mode. Consequently, if the user level software 150 requires a large region of memory to be allocated to it, the banks that contain that large region will remain powered during deep sleep mode, even if the data is not essential. Therefore, it is advantageous to release blocks when the data is no longer needed.

However, one shortcoming of the dynamic allocator 120 is that a request for a block may fail. For example, if the user level software 150 requires a block of 128 k Bytes, it may be possible that, due to fragmentation, there are no such large blocks that are available for the user level software 150. In this scenario, the dynamic allocator 120 will report failure and will not be able to provide the requested memory to the user level software 150.

To address this issue, a new construct is created, which is referred to as memory reservations. Memory reservations differ from allocations in several important ways. First of all, memory reservations decouple the allocation of memory from the retention of that memory during deep sleep mode. In other words, a block of memory may be reserved by the user level software 150, and not be retained during deep sleep mode. Memory reservations are handled by the dynamic block reservation module 130.

The dynamic block reservation module 130 provides a different interface to the user level software 150 than the dynamic allocator 120. Specifically, this interface allows the user level software 150 to:
reserve a block of a requested size;
request retention of that block;
remove the retention request for that block; and
release the block.

Figure 5:
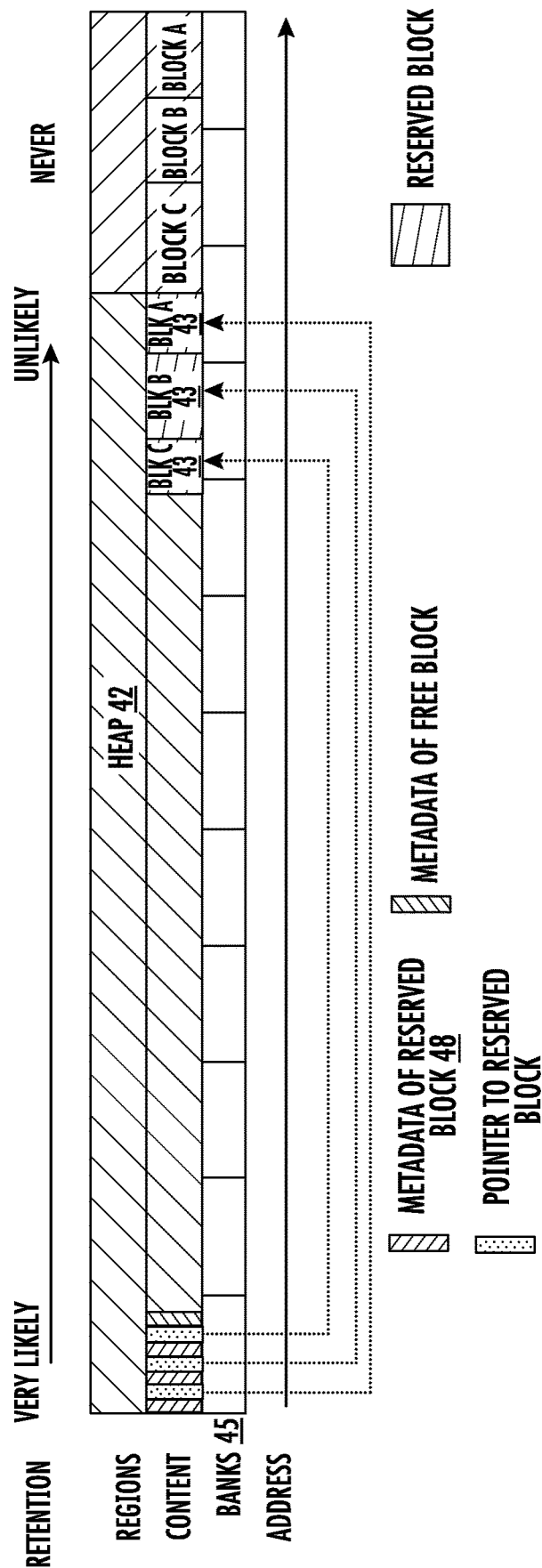
FIG. 5 shows the location of metadata and data blocks associated with memory reservations.

Because the retention of the block is independent of its reservation, the metadata 48 for memory reservations is kept in a separate region of memory. Specifically, the metadata 48 for reservations may be stored at the beginning of the heap 42, which contains the data that is most likely to require retention. Meanwhile, the actual reserved block may be located in a different portion of the heap 42. In some embodiments, the actual reserved blocks are allocated near the end of the heap 42. FIG. 5 shows the location of the metadata 48 and the reserved blocks according to one embodiment. Note that the metadata 48 is located near the start of the heap 42, while the reserved blocks are located near the end of the heap 42. In certain embodiments, blocks are reserved at initialization, such that memory reservations occur before any memory allocations. In this scenario, the metadata 48 will appear at the beginning of the heap 42, while the blocks are reserved starting from the end of the heap 42.

Additionally, the dynamic block reservation module 130 utilizes the same double-linked lists that are used by the dynamic allocator 120. Thus, the metadata 48 associated with memory reservations may include the following:
whether the block is currently reserved;
the length of the block;
pointer to the metadata for the next block;
pointer to the metadata for the previous block; and
the location of the reserved block.

Determining which banks 45 need to be powered on during deep sleep mode is handled somewhat for differently memory reservations. First, the memory manager core 110 tracks which memory reservations 43 are located in which banks 45. The memory manager core 110 then determines, for each of these memory reservations 43, whether the user level software 150 has requested that this memory reservation 43 be retained. For each memory reservation in a bank 45 that is to be retained, the counter 46 associated with that bank is incremented. If the user level software 150 later transmits a request to not retain the memory reservation 43, the counter 46 is decremented.

Note that a bank 45 may contain both memory allocations and memory reservations 43. In this case, the counter 46 for that bank combines the functions of the two counters described above to determine whether the bank 45 needs to remain powered on during deep sleep mode.

The memory manager 100 also includes a memory pool module 140. This memory pool module 140 is responsible for creating pools of memory. This is typically done by requesting a memory reservation and using the block of reserved memory to serve as the memory pool.

Note that FIG. 2 shows one embodiment of the memory manager 100. However, in other embodiments, the memory manager 100 may be designed using different components. However, the functions of the memory manager 100 are as described herein.

Figure 6:
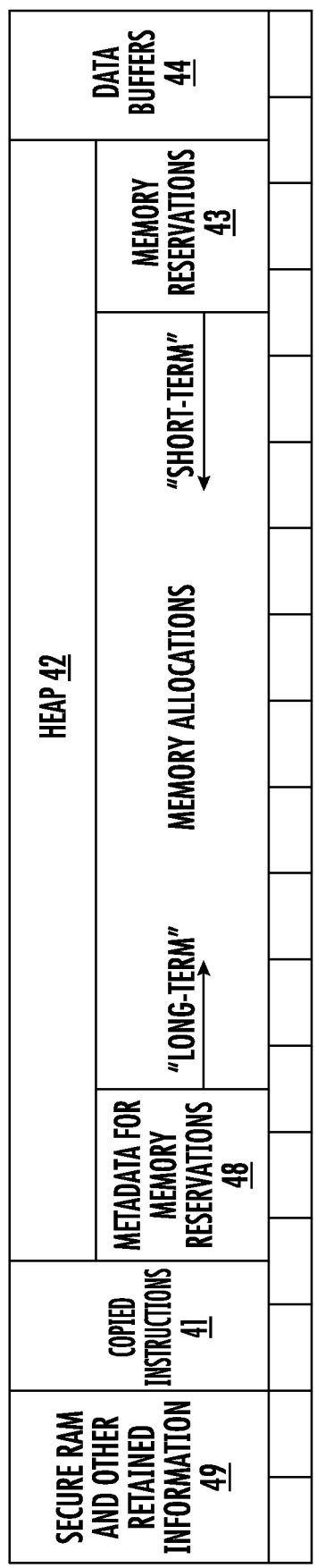
FIG. 6 shows the layout of the memory with memory allocations and memory reservations according to one embodiment.

As described above, the data memory device 40 may also contain instructions 41, which must be retained during deep sleep mode. Thus, the instructions 41 may be disposed before the beginning of the heap 42. FIG. 6 shows the memory layout according to one embodiment. As explained earlier, the memory is organized such that data that must be retained during deep sleep mode is preferably located near the start of the data memory device 40.

To achieve the memory layout shown in FIG. 6, memory is allocated during a link time phase and a run time phase. Each is described below. The linker is used to designate certain regions of the volatile memory prior to execution of the software.

First, there may be some secure RAM or other information 49 that must be retained. These may be located at the starting address of the data memory device 40. These regions of memory are allocated by the linker at link time. Additionally, any instructions 41 that are copied to data memory device 40 are also typically located near the starting address of the data memory device 40. The location of the instructions 41 is also determined by the linker at link time.

During run time phase, the rest of the memory is allocated. First, the instructions 26 from memory device 25 are copied to the region reserved by the linker for instructions 41. Then, the software performs an initialization process, where permanent allocations of memory are made. The user level software 150 defines its requirements for permanent reservations and declares these requirements to the memory manager 100. The memory manager 100 is written such that the first task during this initialization process is to allocate the data buffers 44 requested by the user level software 150. Since these data buffers 44 do not need to be retained during deep sleep mode, these data buffers 44 are located at the end of the data memory device 40. Note that these data buffers 44 do not have any metadata associated with them, so they cannot be released at a later time. The remainder of the memory is referred to as the heap 42. Next, the memory manager 100 is written such that memory reservations 43 are allocated next by the initialization process. These memory reservations 43 may be associated with network stacks, drivers or other functions, as declared by the user level software. As explained above, the metadata 48 associated with memory reservations 43 is retained during deep sleep mode. Therefore, the metadata 48 is located at the beginning of the heap 42. Additionally, as explained earlier, it may be advantageous for the memory reservations 43 to be located at the end of the heap 42. This completes the initialization process, and the rest of the heap 42 is available for dynamic allocations by the user level software 150. Thus, the region of the heap 42 that is now available for memory allocations is contiguous and located between the metadata 48 for the memory reservations 43 and the blocks used for the memory reservations 43.

Further, as described above, the dynamic allocator 120 places "long-term" allocations near the beginning of the heap 42, such as adjacent to the metadata 48 for the memory reservations, and "short-term" allocations near the end of the heap 42, such as adjacent to the reserved blocks used for the memory reservations 43.

The present system has many advantages. First, as described above, volatile memory is one of the largest power consumers during deep sleep mode for low power network devices. Creating a method and system that optimizes memory usage while also minimizing power consumption of the memory during deep sleep mode is very beneficial. Further, by defining two different methods to request blocks of memory (memory allocations and memory reservations), the needs of the user level software 150 may be met, while also attempting to optimize power consumption in the deep sleep mode. Memory reservations allow the user level software 150 to reserve a large contiguous block of memory, while independently indicating whether that block needs to remain powered on during deep sleep mode. In contrast, blocks that have memory allocations are always powered on during deep sleep mode. The use of memory reservations reduces the possibility that the user level software 150 will be unable to acquire the block at a later time, while still attempting to minimize power consumption. Further, the characterization of blocks by the user level software 150 when requesting an allocation also enables the memory manager 100 to arrange the memory in a way that may help to ensure that the maximum number of banks 45 are powered off during deep sleep mode.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of allocating memory within a memory device, wherein the memory device is implemented using a plurality of banks, wherein power to each bank is independently controlled, the method comprising:
    performing a link time phase, wherein certain portions of the memory device are designated by a linker; and
    performing a run time phase, which comprises:
        copying instructions from a nonvolatile memory to a first portion of the memory device previously designated by the linker;
        receiving memory requirements from user level software and based on those memory requirements, performing an initialization process, wherein the initialization process comprises:

allocating memory for data buffers which do not need to be retained during deep sleep mode in a second portion of the memory device; and servicing memory reservations from user level software after the copying and allocating are completed; wherein memory that is reserved is disposed in a third portion located between the first portion and the second portion.

2. The method of claim 1, wherein servicing memory reservations comprises:

reserving a block of memory, having a size requested by the user level software in a respective memory reservation; and storing metadata associated with a corresponding reserved block; wherein the reserved block and the metadata are not located adjacent to one another.

3. The method of claim 2, wherein the run time phase further comprises:

allocating memory for user level software in the memory device, after the memory reservations have been serviced.

4. The method of claim 3, wherein the memory that is allocated for the user level software is disposed in a fourth portion between the metadata for the reserved blocks and the reserved blocks.

5. The method of claim 4, wherein allocating memory comprises: allocating memory based on a lifespan, as indicated by the user level software, such that blocks associated with long term allocations are disposed near a first end of the fourth portion and blocks associated with short term allocations are disposed near an opposite second end of the fourth portion.

6. The method of claim 5, wherein the first end is adjacent to the metadata for the reserved blocks.

7. The method of claim 5, wherein the opposite second end is adjacent to the reserved blocks.

8. The method of claim 7, wherein the metadata for the reserved blocks is disposed adjacent to the first portion; and the reserved blocks are disposed adjacent to the second portion.

9. A device, comprising:
a processing unit;
a nonvolatile memory;
a data memory device, comprising a plurality of banks wherein power to each bank is independently controlled; and
a memory manager, wherein the memory manager is configured to:
copy instructions from the nonvolatile memory to a first portion of the memory device previously designated by a linker;
receive memory requirements from user level software and based on those memory requirements, perform an initialization process, wherein the initialization process comprises:
allocating memory for data buffers which do not need to be retained during deep sleep mode in a second portion of the memory device; and
servicing memory reservations from user level software after the copying and allocating are completed; wherein memory that is reserved is disposed in a third portion located between the first portion and the second portion.

10. The device of claim 9, wherein, to service a memory reservation, the memory manager reserves a block of memory, having a size requested by the user level software in a respective memory reservation; and stores metadata associated with a corresponding reserved block; wherein the reserved block and the metadata are not located adjacent to one another.

11. The device of claim 10, wherein the memory manager allocates memory for the user level software after the memory reservations have been serviced.

12. The device of claim 11, wherein the memory manager allocates the memory for the user level software in a fourth portion between the metadata for the reserved blocks and the reserved blocks.

13. The device of claim 12, wherein the memory manager allocates memory based on a lifespan, as indicated by the user level software, such that blocks associated with long term allocations are disposed near a first end of the fourth portion and blocks associated with short term allocations are disposed near an opposite second end of the fourth portion.

14. The device of claim 13, wherein the first end is adjacent to the metadata for the reserved blocks.

15. The device of claim 14, wherein the opposite second end is adjacent to the reserved blocks.

16. The device of claim 10, wherein the memory manager disposes the metadata for the reserved blocks adjacent to the first portion; and disposes the reserved blocks adjacent to the second portion.

17. A device, comprising:
a processing unit;
a nonvolatile memory; and
a data memory device, comprising a plurality of banks wherein power to each bank is independently controlled;
wherein the data memory device is organized to contain, in sequence, copied instructions, metadata for memory reservations, memory allocations, reserved blocks associated with the memory reservations, and data buffers.

18. The device of claim 17, wherein the data memory device is organized such that data that needs to be retained during deep sleep mode is located at the beginning of the data memory device.

* * * * *